Figure 6:
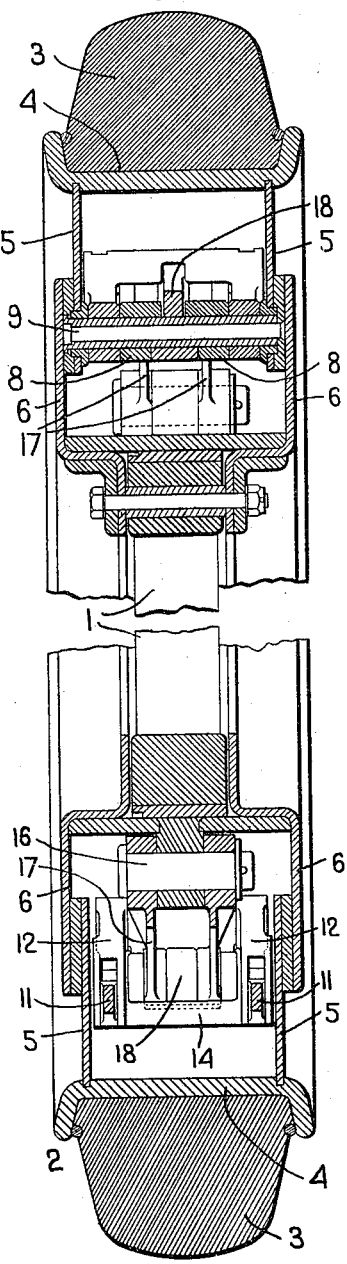

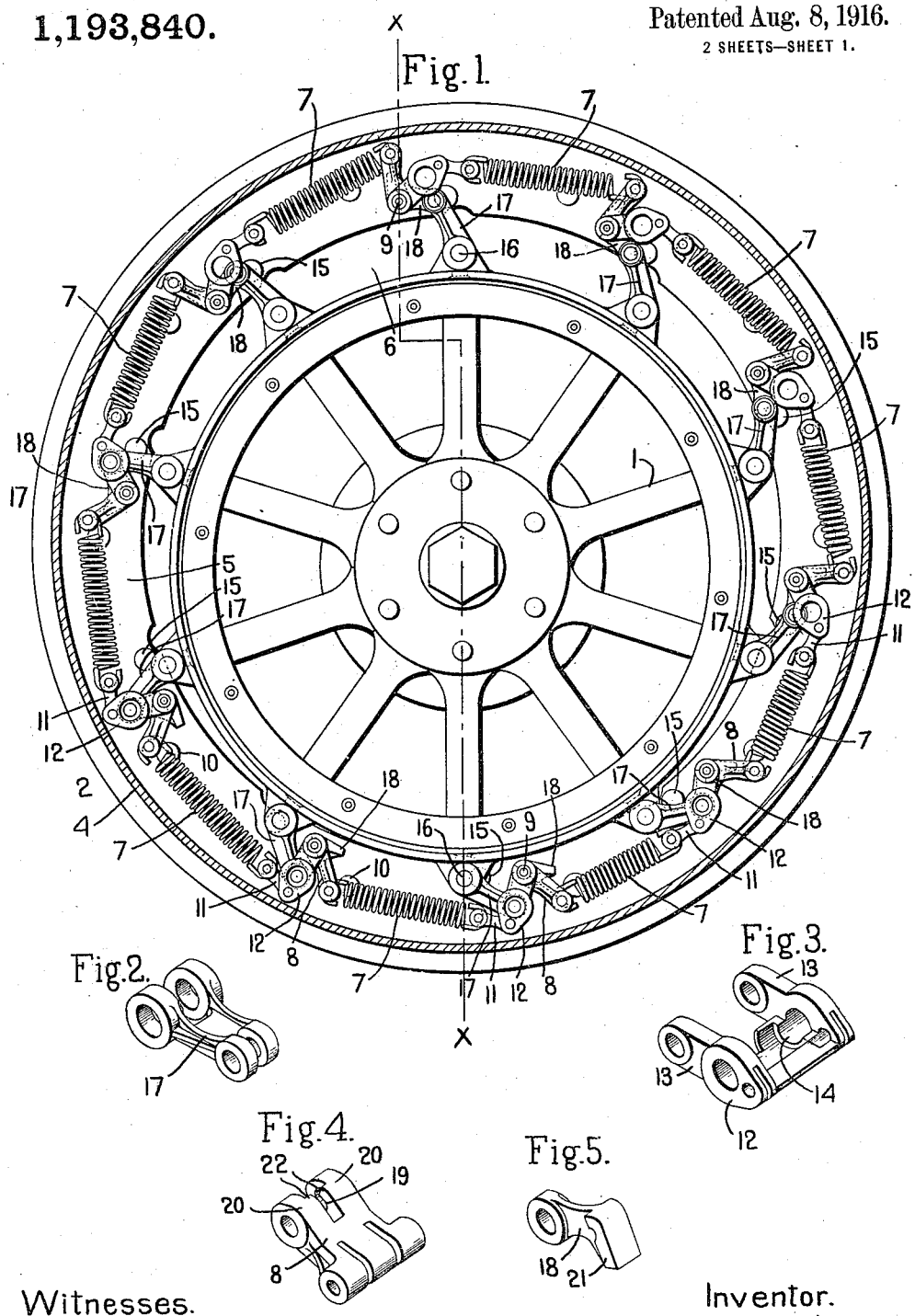

J. A. STAHLE.
RESILIENT WHEEL.
APPLICATION FILED OCT. 27, 1913.

1,193,840.

Patented Aug. 8, 1916.
2 SHEETS—SHEET 2.

Witnesses.
J. Morrill Fuller
Joseph D. Ashe.

Inventor.
John A. Stahle,
by Heard Smith & Tennant.
Atty's.

UNITED STATES PATENT OFFICE.

JOHN A. STAHLE, OF BOSTON, MASSACHUSETTS, ASSIGNOR TO STAHLE MECHANICAL TIRE COMPANY, LIMITED, OF BOSTON, MASSACHUSETTS, A CORPORATION OF MAINE.

RESILIENT WHEEL.

1,193,840.      Specification of Letters Patent.      Patented Aug. 8, 1916.

Application filed October 27, 1913. Serial No. 797,384.

*To all whom it may concern:*

Be it known that I, JOHN A. STAHLE, citizen of the United States, residing at Boston, county of Suffolk, State of Massachusetts, have invented an Improvement in Resilient Wheels, of which the following description, in connection with the accompanying drawing, is a specification, like characters on the drawing representing like parts.

This invention relates to resilient wheels and particularly to wheels of this nature in which the load is supported on contracting, spiral springs located within the rim of the wheel.

The object of the invention is to provide a simple resilient wheel of this type and one in which the springs are so arranged that all of them are active at all times in supporting the load regardless of their position in the wheel and in which the springs are stretched first from one end and then from the other, depending on their position in the wheel. In other words, in my improved device the load supporting springs that are located at the lower side of the wheel are stretched at one end, the other end of said springs being anchored while the same springs when they are brought around into the upper portion of the wheel by the turning of the latter are stretched from said other end, the opposite end being anchored at this time.

Since all of the springs are active at all times in supporting the load, a fewer number of springs are necessary than in a construction where only a certain portion of the springs are active and the remaining springs are idle.

In the drawings I have shown a selected embodiment of my invention which will illustrate the principle thereof but I wish to state that the invention is not limited to the constructional features shown.

Figure 7:
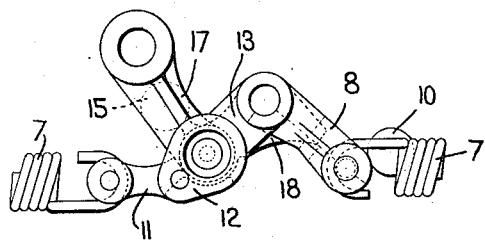
Figure 8:
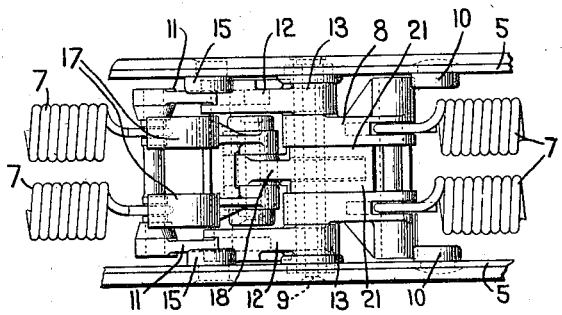
Figure 9:
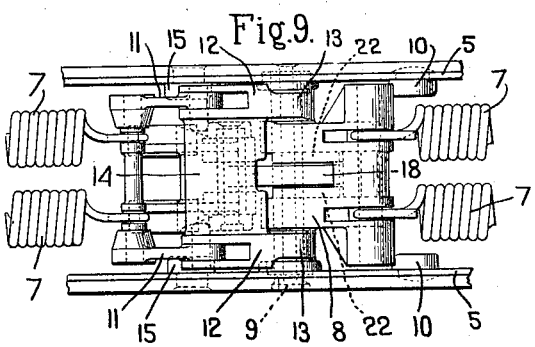

Referring to the drawings, Figure 1 is a side view of a wheel embodying my invention with the rim shown in section; Fig. 2 is a perspective view of the load-supporting link; Figs. 3, 4 and 5 are perspective views of different parts of the wheel; Fig. 6 is an enlarged section partly broken out on the line *x—x*, Fig. 1; Fig. 7 is a view showing the connections for the ends of two adjacent springs; Fig. 8 is a top plan view of Fig. 7; Fig. 9 is a bottom plan view.

In the drawings 1 indicates a wheel body having any suitable or usual construction and 2 indicates generally an exterior rim which surrounds the wheel body and which carries a tread member 3 of some suitable construction. This tread member may either be a solid rubber tire or may be a pneumatic tire or may have any desired or approved construction. The exterior rim is shown as provided with a rim member 4 to which the tread member 3 is secured and which is provided with inwardly-extending flanges 5, the ends of which overlap outwardly-extending flanges 6 secured to the wheel body. The flanges 5 and 6 form between them an annular chamber in which the load-supporting springs involving my invention are received. These springs are shown at 7 and there may be any desired number of them depending upon the use to which the wheel is to be put. The springs are contracting, spiral springs and are so arranged that they are all under tension at all times and thus all of them are active at all times in supporting the load. Furthermore, these springs are so arranged that when they are on the lower side of the wheel one end of each spring is anchored and the resiliency is secured by stretching the spring from the other end, while when the springs are on the outer side of the wheel the said other ends thereof are anchored and the resiliency is secured by stretching them from the first-named end. One end of each spring 7 is secured to an anchoring member 8 that is pivotally mounted upon a pin 9 supported in the flanges 5 of the exterior rim and these flanges each have rigid therewith and extending inwardly therefrom projections or abutments 10 adjacent the anchoring members 8 and with which the latter are adapted to engage at such times as the springs 7 are to be anchored from the end which is secured to the anchoring member.

The other end of each spring 7 is pivotally connected by a link 11 to a member 12 that is also pivotally mounted on the pin 9. This member 12 is shown as formed with two arms 13 which receive the anchoring member 8 between them and which are connected by a bridge portion 14, the purpose of which will be presently described. The flanges 5 of the rim are shown as provided with other projections or abutments 15 which are adapted to coöperate with the member 12 to form a means for anchoring the springs at the ends connected to the links 11 at such times as the springs are being stretched from the other end.

The wheel body has pivotally secured thereto at 16 a load-supporting link 17, there being one such link for each of the springs 7. Each link 17 is pivotally connected at its outer end to an L-shaped member 18 that in turn is pivotally sustained on the pin 9, said L-shaped member operating in a slot or space 19 formed between the arms 20 of the forked end of the anchoring member 8, and also playing between the side arms of the member 12. The portion 20 of each L-shaped member 18 is provided with lateral flanges 21 that are adapted to engage ribs or stops 22 formed on the inner faces of the arms of the anchoring member 8. The outer ends of the load-supporting members 17 and of the L-shaped members 18 are adapted to rest against the bridge 14 of the member 12 at such times as the springs are being stretched from the end which is connected to the member 12

There is a connection similar to that above described for each of the springs 7 and when the wheel is unloaded the parts of each connection assume about the position shown in Fig. 7, that is the outer ends of the members 17 and the L-shaped members 18 rest against the bridge 14 of the member 12 and the flanges 21 of the L-shaped members have bearing against the ribs 22 of the anchoring member 8. Furthermore, the outer end of each anchoring member 8 has bearing against the abutment or stop 10.

When the wheel is supporting a load, the body 1 thereof will drop relative to the exterior rim and the body and rim will assume the relative positions shown in Fig. 1 and the points 16 and 9 on the wheel body and rim respectively will approach each other at the lower side of the wheel but will move away from each other at the upper side of the wheel. When this happens the movement toward each other of the points 16 and 9 at the lower side of the wheel will cause the load-supporting members 17 to act against the bridge 14 of the member 12, thereby swinging the lower end of said member toward the right, Fig. 1, and thereby stretching the spring 7 which is connected to the member 12 from its right hand end, it being noted that the left hand end of the spring is anchored because of the fact that the anchoring member 8 rests against the stop 10. This movement of the member 17 turns the L-shaped member on its pivot 9 and carries the flanges 21 thereof away from the ribs 22.

At the upper side of the wheel the movement of the pivotal points 16 and 9 away from each other causes the members 17 to turn the L-shaped members 18 about their pivots 9 and as the flanges 21 are bearing against the ribs 22 of the anchoring members, this movement swings said anchoring members 8 to the right, Fig. 1 thus stretching the spring 7 from the end which is connected to the anchoring member. At said upper side of the wheel the opposite end of the wheel, or that which is connected to the member 12 is anchored, this being provided for by said member 12 resting against the stop or projection 15.

It will thus be seen that the springs 7 are not permanently anchored at one end but are alternately anchored at each end, said springs stretching from one end when they are on the upper side of the wheel and stretching from the other end when they are on the lower side of the wheel. Furthermore, all of the springs come into play at all times and thus no dead weight in springs is carried which is not of use in resiliently supporting the load.

Having fully described my invention, what I claim as new and desire to secure by Letters Patent is:

1. In a resilient wheel, the combination with a wheel body, of an exterior rim, a plurality of contracting, spiral springs situated between said body and rim and a connection between each end of each spring and both the wheel body and rim by which the weight on the wheel causes each spring to expand from one end when on the upper side of the wheel and from the other end when on the under side of the wheel.

2. In a resilient wheel, the combination with a wheel body, of an exterior rim surrounding said body, a plurality of helical springs situated between said wheel body and rim and extending peripherally of the wheel body, means connecting each spring to the rim, and a connection between each end of each spring and the wheel body by which movement of the wheel body and rim toward each other from a neutral position will stretch the spring from one end and movement of said wheel body and rim away from each other from their neutral position will stretch the spring from the other end.

3. In a resilient wheel, the combination with a wheel body, of an exterior rim, a plurality of load-sustaining contracting springs situated between said parts, a movable connection between each end of each spring and one of said parts, means to limit the movement of each connection in one direction and means connecting said connections with the other part whereby when each spring is at the upper side of the loaded wheel one connection is moved in a direction to extend the spring, the connection at the other end being held against movement by its limiting means, and when said spring is at the lower side of said wheel the said other connection is moved in the opposite direction whereby the load is supported from first one end and then the other of said spring.

4. In a resilient wheel, the combination with a wheel body, of an exterior rim, a plurality of load-supporting springs between said wheel body and rim, a movable connection between each end of each spring and said rim, means carried by the rim to limit the movement of the connections for each spring toward each other and means connecting the wheel body with said movable connections and operating to transmit the load to each spring through one connection when the spring is at the upper side of the wheel and through the other connection when the spring is at the under side of the wheel.

5. In a resilient wheel, the combination with a wheel body, of an exterior rim, a plurality of load-supporting springs, a link connected to each end of each spring and pivotally connected to the rim, stops to limit the movement of the links for each spring toward each other and a connection between the wheel body and each link whereby the load is transmitted to each spring through one link when the spring is at the upper side of the wheel and through the other link when the spring is at the under side of the wheel.

6. In a resilient wheel, the combination with an exterior rim, a plurality of contracting, spiral, load-supporting springs and means to transmit the load to each spring at one end thereof when said spring is at the upper side of the wheel and at the other end thereof when said spring is at the lower side of the wheel.

7. In a resilient wheel, the combination with a wheel body, of an exterior rim, a plurality of contracting, spiral load-supporting springs between the wheel body and rim, a link connected to each end of each spring and pivotally connected to the rim, load-transmitting members pivoted to the wheel body and means for transmitting the load on the wheel body through said load-transmitting members to the links at one end of the springs when said springs are in the upper side of the wheel and to the links at the other end of the springs when said springs are at the lower side of the wheel.

8. In a resilient wheel, the combination with a wheel body, of an exterior rim, a plurality of contracting, spiral, load-supporting springs between the wheel body and rim, a plurality of load-transmitting members pivoted to the wheel body, L-shaped members pivoted to the rim and connected to the load-transmitting members, said L-shaped members having means to engage the links at one end of the springs thereby to transmit the loads to the springs at said end when the springs are at the lower side of the wheel and having means to engage the other links thereby to transmit the load to the other ends of the springs when they are at the upper side of the wheel.

9. In a resilient wheel, the combination with a wheel body, of an exterior rim encircling said body, a plurality of contracting spiral springs situated between the wheel body and rim and extending peripherally of the wheel body, a connection between each end of each spring and the rim, means to limit the movement of the connections at both ends of each spring toward each other, and means connecting said connections with the wheel body and arranged to operate through the connection at one end of each spring when the latter is in the upper part of the wheel body to expand said spring and through the connection at the other end of said spring to expand the latter when the spring is in the lower part of the wheel body.

In testimony whereof, I have signed my name to this specification, in the presence of two subscribing witnesses.

JOHN A. STAHLE.

Witnesses:
 LOUIS C. SMITH,
 THOMAS J. DRUMMOND.

Copies of this patent may be obtained for five cents each, by addressing the "Commissioner of Patents, Washington, D. C."